(12) United States Patent
Johnson

(10) Patent No.: US 6,366,836 B1
(45) Date of Patent: Apr. 2, 2002

(54) METHOD AND APPARATUS FOR PROVIDING ADAPTIVE ALTITUDE PRESELECTOR UNITS

(75) Inventor: Stephen R. Johnson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/587,850

(22) Filed: Jun. 6, 2000

(51) Int. Cl.[7] .............................. G06F 17/00; G06F 7/00
(52) U.S. Cl. ..................... 701/4; 701/5; 701/8; 701/16; 244/180; 244/181; 244/183
(58) Field of Search ............................. 701/4, 5, 9, 16, 701/14, 18, 120, 300; 244/180, 181, 182, 183, 75 R, 158 R

(56) References Cited

U.S. PATENT DOCUMENTS 4,577,275 A * 3/1986 Adams et al. ................. 701/5
5,574,647 A * 11/1996 Liden ............................ 701/8
5,968,106 A * 10/1999 DeVlieg et al. .............. 701/70

* cited by examiner

*Primary Examiner*—Gertrude Arthur
(74) *Attorney, Agent, or Firm*—Nathan O. Jensen; Kyle Eppele

(57) ABSTRACT

A method of changing a preselect altitude value includes receiving an input from a pilot. In response, the preselect altitude value is changed by a first amount from a current preselect altitude value toward a minimum altitude value. The first amount that the preselect altitude value is changed by is dependent upon a proximity of the current preselect altitude value to the minimum altitude value such that if a difference between the current preselect altitude value and the minimum altitude value is greater than a first predetermined interval, the first amount is equal to the first predetermined interval. If the difference between the current preselect altitude value and the minimum altitude value is less than the first predetermined interval, then the first amount is less than the first interval, for example resulting in the preselect altitude value being set directly to the minimum altitude value.

17 Claims, 8 Drawing Sheets

METHOD AND APPARATUS FOR PROVIDING ADAPTIVE ALTITUDE PRESELECTOR UNITS

FIELD OF THE INVENTION

The present invention relates to aviation electronics (avionics). More particularly, the present invention is related to a method and apparatus for displaying a preselector altitude (PSA) value and for adaptively changing a manner in which the PSA value is changed.

BACKGROUND OF THE INVENTION

Complex aircraft of today require electronic instruments which provide a large amount of information displayed to a pilot of the aircraft. One type of display unit for providing information to a pilot is a Primary Flight Display (PFD). PFD's display flight critical information to the pilot on a relatively compact display screen. The information displayed often includes an air speed indicator, an altimeter, a vertical speed indicator, an artificial horizon indicator and other appropriate display information. Another piece of information that is typically displayed on a PFD is a preselect altitude (PSA) value or setting. The PSA value, which is typically displayed on the PFD above the altimeter, is provided to the auto pilot. The auto pilot is programmed to level off and maintain the aircraft at the altitude indicated by the PSA value. The PSA value is normally set by the pilot in one hundred foot increments.

Another feature which is typically displayed on a PFD is the BARO MIN reference value. The BARO MIN reference is a displayed altitude at which, if the pilot cannot visibly see the runway, the landing approach is to be aborted. The BARO MIN reference is determined by the Federal Aviation Authority (FAA), and varies in increments of ten feet. Since the PSA value can typically be changed in one hundred foot increments, while the BARO MIN reference value is set in ten foot increments, it is frequently the case that the PSA value must be set at an altitude which is between ten feet and ninety feet above the BARO MIN reference value. Consequently, the pilot of the aircraft may have to abort a particular landing approach once the aircraft reaches the PSA value altitude, without actually reaching the BARO MIN altitude. In some of these instances, if the aircraft were allowed to descend to the BARO MIN altitude, the runway would have been visible to the pilot and it would not have been necessary to abort the landing approach.

SUMMARY OF THE INVENTION

A method of changing a preselect altitude value includes receiving an input from a pilot. In response, the preselect altitude value is changed by a first amount from a current preselect altitude value toward a minimum altitude value. The first amount that the preselect altitude value is changed by is dependent upon a proximity of the current preselect altitude value to the minimum altitude value such that if a difference between the current preselect altitude value and the minimum altitude value is greater than a first predetermined interval, the first amount is equal to the first predetermined interval. If the difference between the current preselect altitude value and the minimum altitude value is less than the first predetermined interval, then the first amount is less than the first interval, for example resulting in the preselect altitude value being set directly to the minimum altitude value.

DETAILED DESCRIPTION OF AN ILLUSTRATIVE EMBODIMENT

The present invention provides a convenient method of changing the size of the steps by which the altitude preselector (PSA) setting or value is incremented or decremented during certain modes of operation of the aircraft. In embodiments described below the PSA value is normally set by the pilot in one hundred foot steps. However, during the approach to landing phase of flights, the avionics system of the present invention automatically changes mode such that the pilot can conveniently change the PSA value to a ten foot incremented or decremented value. As will be described in greater detail below, the invention utilizes the presence of a secondary pilot selection to modify the PSA value interval. For instance, during the approach to landing, the pilot may select a BARO MIN reference to be displayed on the altimeter, indicating a minimum altitude at which visual contact with the runway must be made or the landing approach must be aborted. Since the BARO MIN is conventionally set in ten foot increments and represents the minimum altitude during approach, in some embodiments of the invention if BARO MIN is enabled then the PSA value can be set normally to any one hundred foot increment, as well as to the value of the BARO MIN reference. The description which follows, along with the FIGS. included herewith, illustrates one embodiment of the invention. However, as will be understood by those of skill in the art, many other embodiments are possible. These other embodiments also fall within the scope of the invention.

Figure 1:
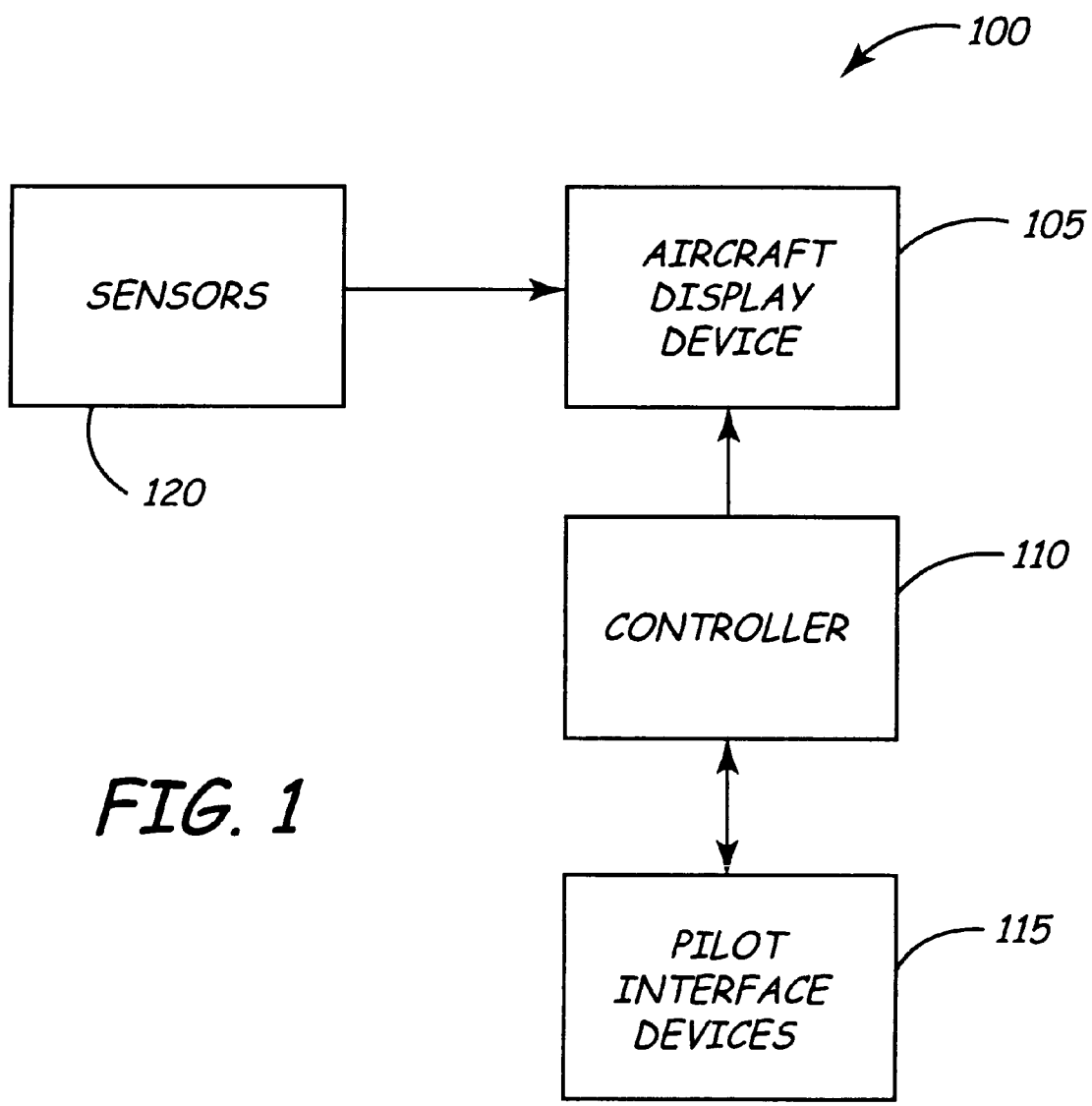
FIG. 1 is a general schematic block diagram of an aircraft avionics systems in accordance with the present invention.

FIG. 1 is a block diagram illustrating avionics system 100 in accordance with embodiments of the invention. Avionics system 100 includes aircraft display device 105, controller 110, pilot interface devices 115 and sensors 120, as well as other devices not shown. Aircraft display device 105 can be, for example, a Primary Flight Display (PFD) or other types of aircraft displays. Controller 110 can be any of a variety of devices or systems which directly or indirectly control the information displayed on aircraft display device 105. Controller 110 and display device 105 can be integrated into a single system or device if desired.

Pilot interface devices 115 can be any of a variety of devices with which pilots change the information displayed on aircraft display device 105 and/or change the mode or operation of the aircraft. For example, pilot interface devices 115 can include a Course Heading Panel (CHP) and a Display Control Panel (DCP) of the types which are described below in greater detail. Aircraft sensors 120 can be altitude sensors for determining an altitude of the aircraft. In some embodiments of the invention, these sensors are barometric altitude sensors. However, these sensors can also be other altitude determining sensors such as Global Positioning System (GPS) sensors. As discussed above, the present invention includes methods in which avionics system 100 allows the pilot to change the PSA value by different intervals depending upon the mode of operation of the aircraft.

Figure 2A:
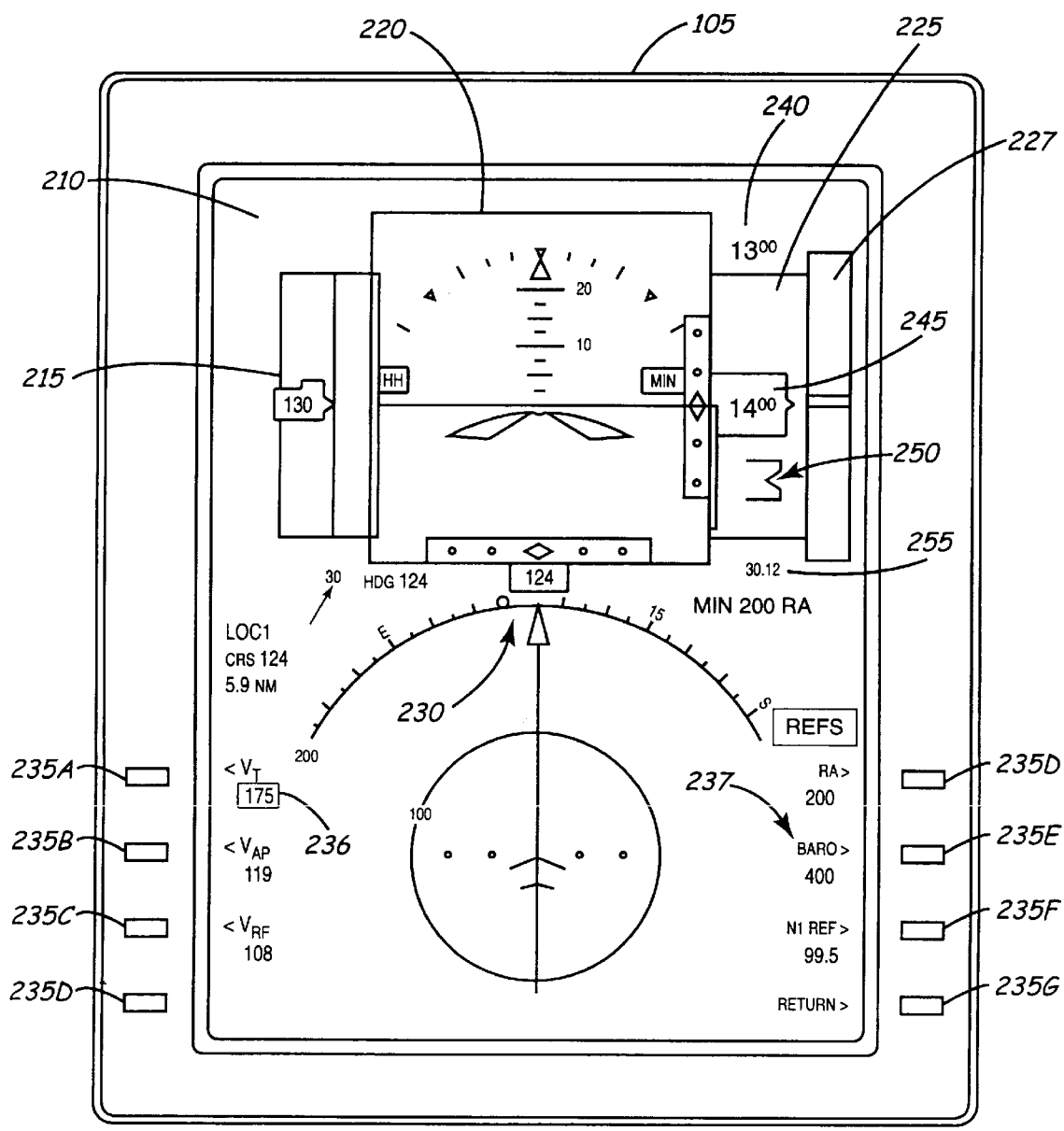
FIGS. 2A–2C are front view schematic drawings of a primary flight display (PFD), which illustrates operation of a preselect altitude (PSA) setting or value during a first mode of operation.
Figure 2B:
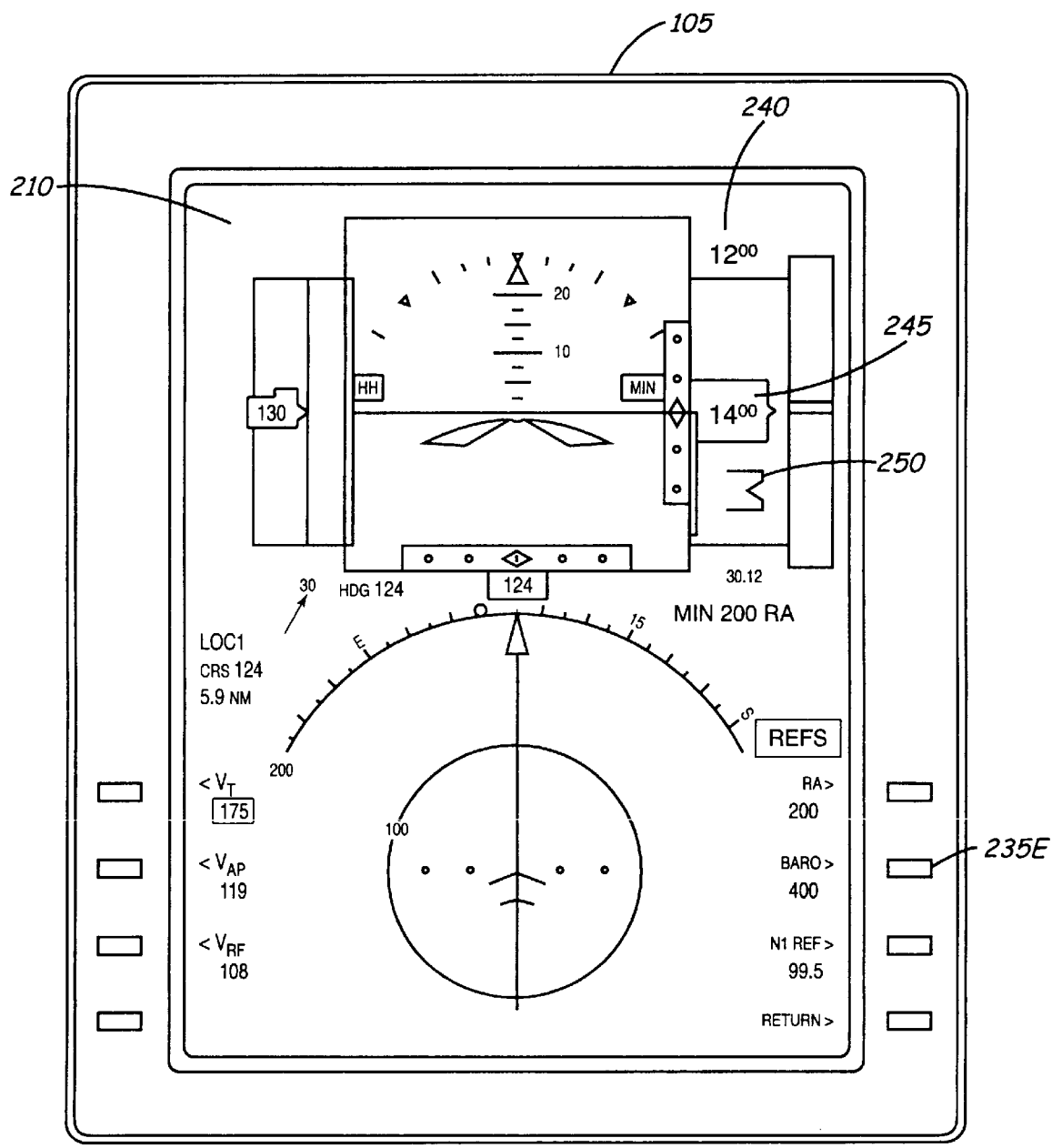
Figure 2C:
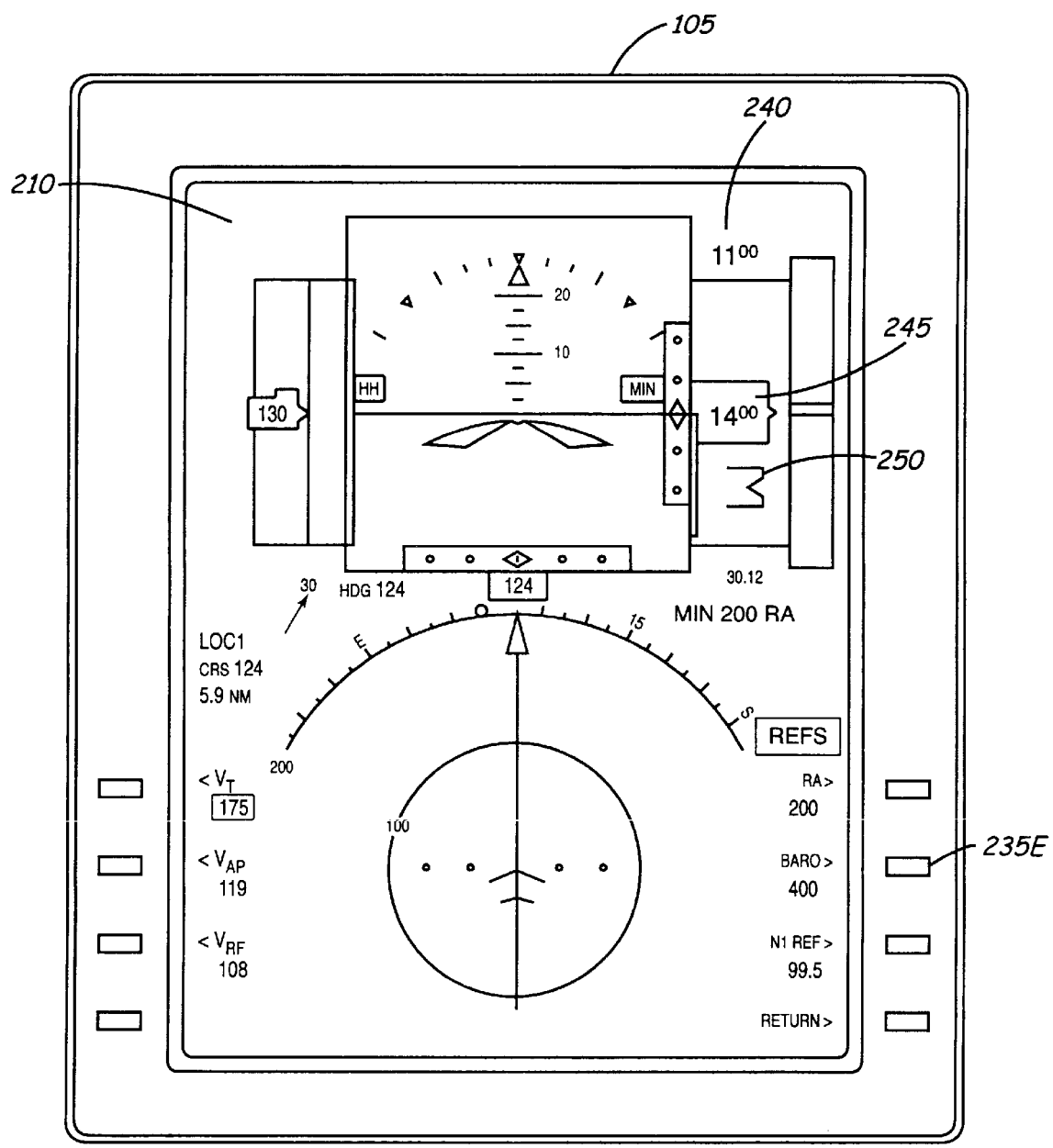

FIGS. 2A–2C are diagrammatic illustrations of display device 105 displaying a first screen 210 during a typical mode of operation of the aircraft. Screen 210, which is sometimes referred to as a REFS screen, includes representations of an air speed indicator 215, an attitude indicator 220, an altimeter 225, a vertical speed indicator 227 and a heading indicator 230. In the area of altimeter 225, screen 210 also includes representations of a digital PSA value 240, a digital current altitude 245 (which can be a barometric altitude for example), an analog or graphical PSA value symbol 250, and a barometric pressure setting value 255. Analog PSA symbol 250 provides to the pilot a graphical representation of the altitude corresponding to the PSA value. This graphical representation is used as described below in greater detail.

Figure 3:
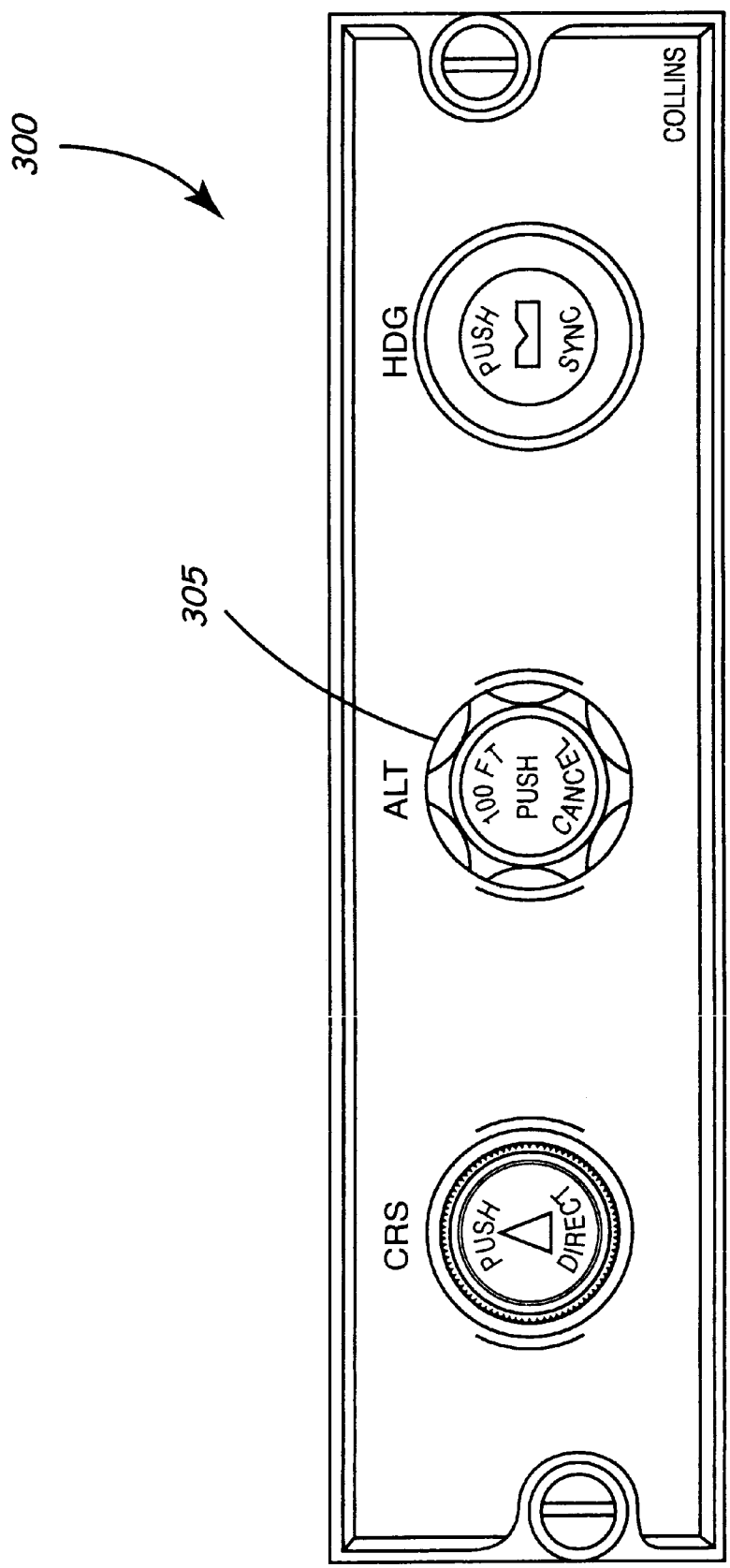
FIG. 3 is a front view drawing of a course heading panel (CHP) which is used to set the PSA value in accordance with the present invention.

Referring briefly to FIG. 3, shown is one embodiment of a CHP 300, which is similar to CHPs found in conventional avionics systems with the exception of the manner in which avionics system 100 utilizes an input from CHP 300 to vary the PSA value change interval. As shown in FIG. 3, CHP 300 includes rotatable ALT knob 305. Knob 305 is used to set the PSA value in the illustrative embodiments shown.

Referring back to FIGS. 2A–2C, illustrated is a manner in which the PSA value 240 is incremented or decremented by the pilot during a first mode of operation. As shown in FIG. 2A, PSA value 240 is set at 1300 feet. Using knob 305 on CHP 300, PSA value 240 can be changed directly to 1200 feet from 1300 feet, as shown in FIG. 2B. This is typically done with one rotational click (or one change of switch setting) of control knob 305. Thus, the interval of change of the PSA value is one hundred in this mode of operation. As shown in FIG. 2C, in this mode of operation the next step for PSA value 240 is 1100 feet. This step for PSA value 240 is achieved with a second rotational click of knob 305. In each of FIGS. 2A–2C, it can be seen that analog PSA symbol or representation 250 moves upward or downward in proportion to the change in elevation represented by PSA value 240.

As illustrated in FIG. 2A, display device 105 also includes multiple line select keys (LSKS) 235. While LSKs 235A–235G are shown, any number of LSKs can be included. By pressing LSK 235E, active box 236 is caused to move from item V$_T$ adjacent LSK 235A to item BARO 237 adjacent LSK 235E, causing display device 105 to enter a BARO MIN mode of operation. Other methods of entering the BARO MIN mode (for example without LSKs 235) are possible.

Figure 4:
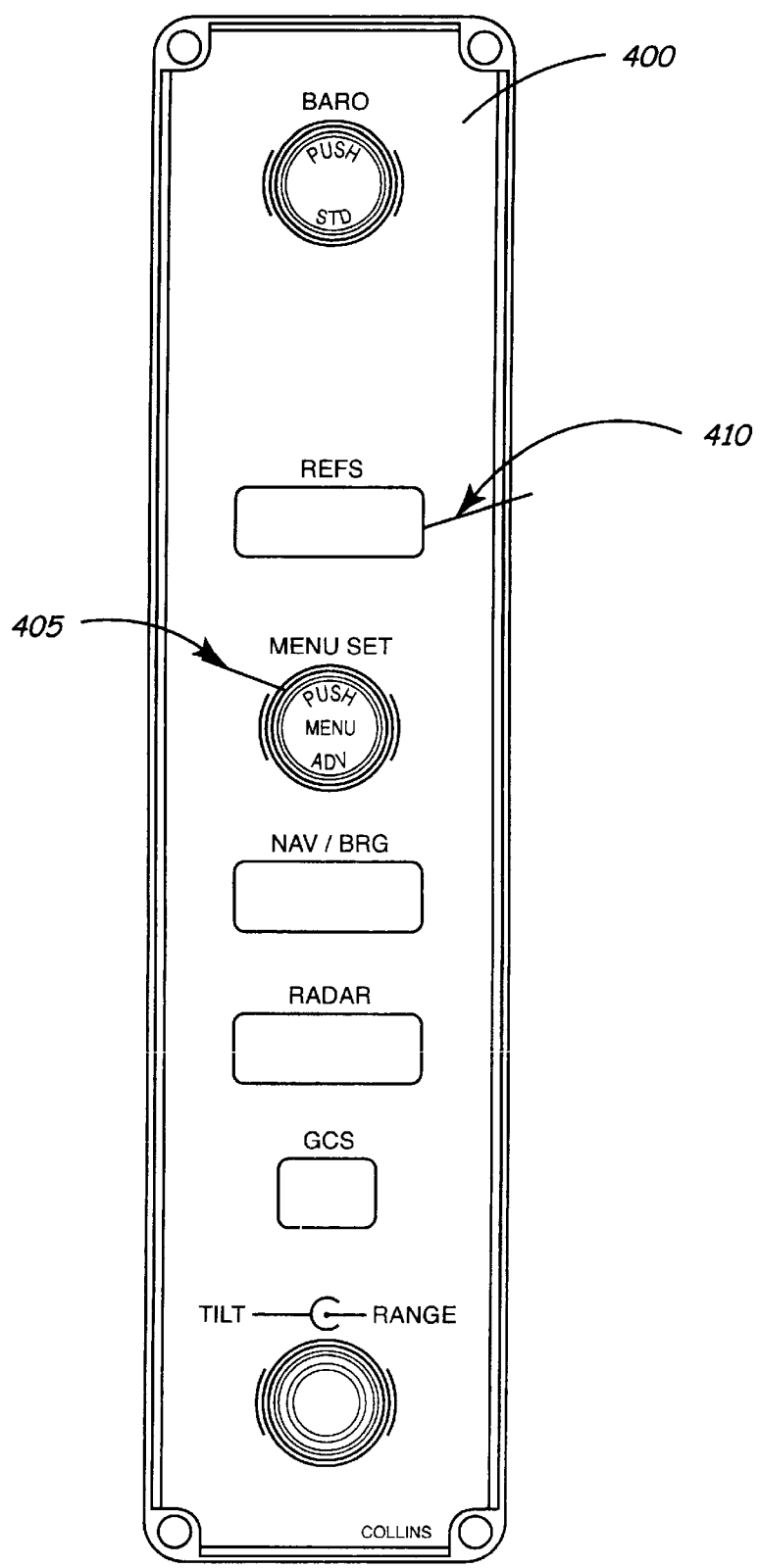
FIG. 4 is a front view drawing of a display control panel (DCP) which is used to modify the BARO MIN value.

Once in the BARO MIN mode, the BARO MIN value (value 505 shown in FIGS. 5A and 5B) can be adjusted using DCP 400 shown in FIG. 4. While BARO MIN is the active menu item, the BARO MIN value 505 can be modified by turning menu set knob 405 on DCP 400. Once again, the BARO MIN value is a minimum altitude to which an aircraft can descend without the runway being within view of the pilot. If the runway is not visible once the aircraft has descended to the altitude represented by the BARO MIN value, then the landing approach is typically aborted. When desired, pressing REFS button 410 on DCP 400 causes the REFS menu to again appear. As noted above, BARO MIN is turned on/off from the REFS menu in this embodiment.

Figure 5A:
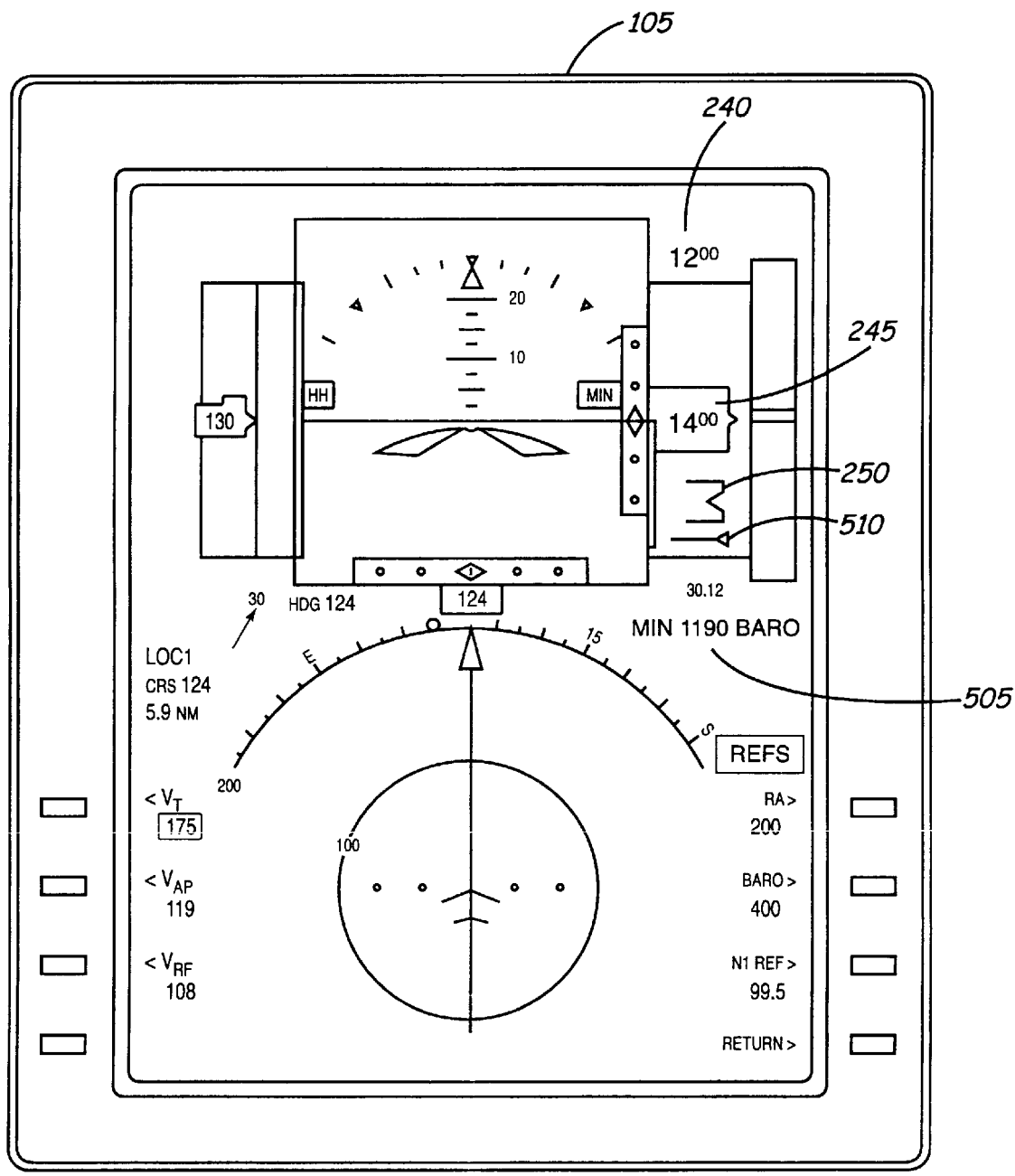
FIGS. 5A and 5B are front view schematic drawings of the PFD, which illustrate a manner in which the PSA value is modified during a second mode of operation.
Figure 5B:
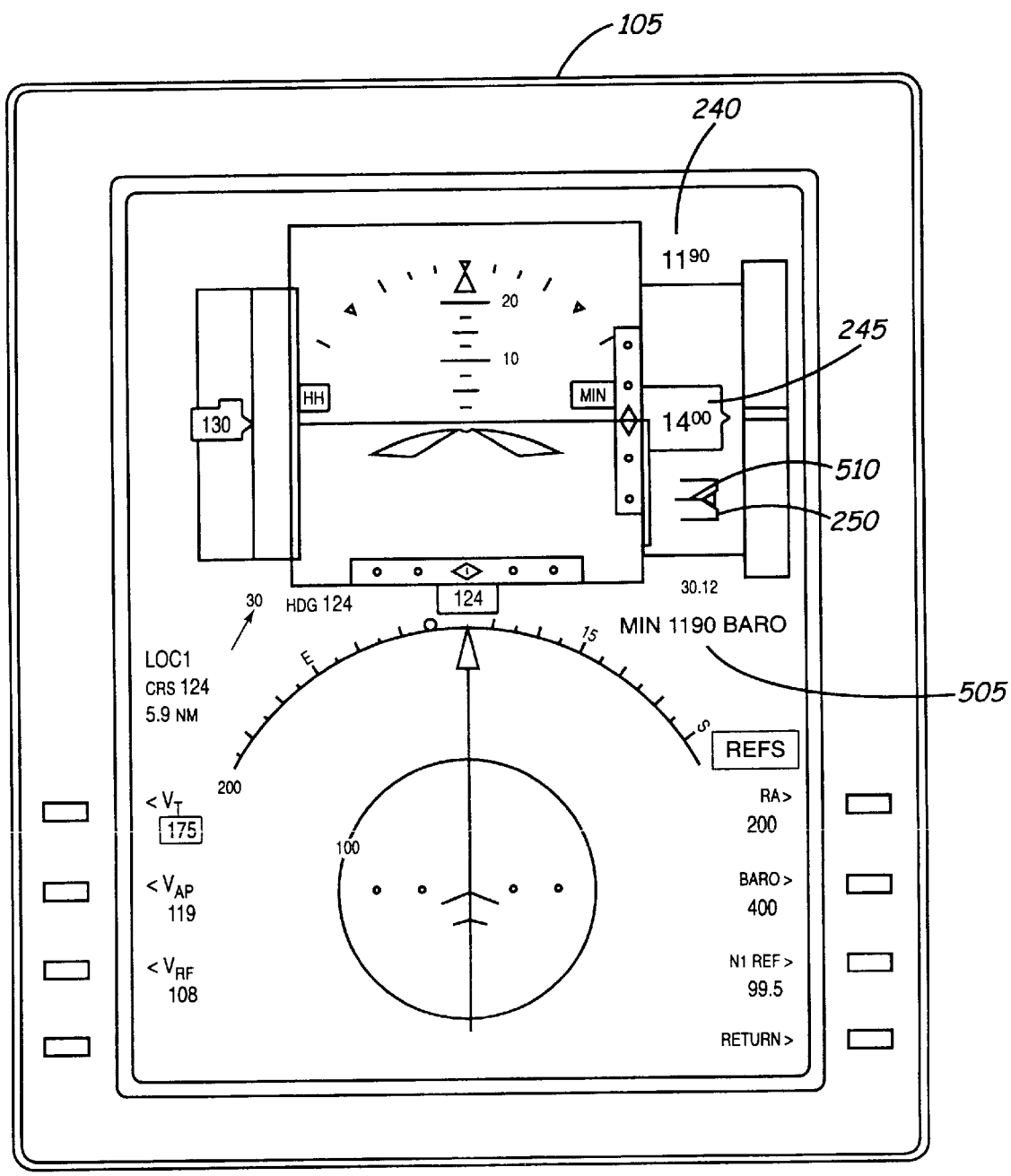

FIGS. 5A and 5B illustrate a second manner in which PSA value 240 can be modified. This second manner corresponds to operation of avionics system 100 while the BARO MIN mode is enabled. While BARO MIN is enabled, rotation of knob 305 on CHP 300 (FIG. 3) causes PSA value 240 to be incremented or decremented in one hundred foot steps at altitudes preceding the BARO MIN value 505. Thus, while BARO MIN is enabled, PSA value 240 can be changed from 1300 feet to 1200 feet in a manner similar to that shown in FIGS. 2A and 2B. However, upon reaching the one hundred foot interval altitude immediately above the BARO MIN value altitude, further rotation of knob 305 to the next rotational position will result in the PSA value 240 changing directly to the BARO MIN value 505. For example, in FIG. 5A PSA value 240 is shown to be 1200 feet, while BARO MIN value 505 is shown to be 1190 feet. In this situation, instead of PSA value 240 next decrementing to 1100 feet (which is below BARO MIN value 505 and therefore unacceptable), PSA value 240 next decrements directly to the BARO MIN value 505, which is 1190 feet in the illustrated example. Thus, in this embodiment, PSA value 240 is decremented by a ten foot interval. If in this example BARO MIN value 505 had been 1110 feet, PSA value 240 would have decremented from 1200 feet directly to 1110 feet, in other words by a ninety foot interval. In yet other embodiments, if desired, when BARO MIN is enabled, PSA value 240 could be decremented in ten foot intervals such that it could take up to nine rotational movements of knob 305 (for example, if PSA value 240 were 1200 feet and BARO MIN value 505 were 1110 feet). However, it is advantageous to minimize the work load on the pilot, and this therefore may represent a less desirable embodiment in some instances.

Another feature provided by display device 105 while in the BARO MIN mode of operation relates to the display of analog or graphical BARO MIN symbol 510. Analog BARO MIN symbol 510 is a graphical representation of the altitude represented by the BARO MIN value 505 relative to analog PSA value symbol 250. As the pilot adjusts the PSA value 240 toward BARO MIN value 505, analog representation 250 of the PSA value approaches analog representation 510 of the BARO MIN value. Upon PSA value 240 reaching BARO MIN value 505, the triangle portion of analog symbol 510 fits within the indentation of symbol 250. This provides a convenient way of informing the pilot that the adjustment of the PSA value 240 toward the BARO MIN value 505 is complete.

Although the present invention has been described with reference to illustrative embodiments, workers skilled in the art will recognize that changes may be made in form and detail without departing from the spirit and scope of the invention.

What is claimed is:

1. A method of changing a preselect altitude value in an avionics system of an aircraft, the method comprising:

receiving a first input from a pilot of the aircraft in a first mode of operation;

changing the preselect altitude value by a first amount from a current preselect altitude value in the first mode of operation in response to the first input;

selecting a second mode of operation with a secondary input by the pilot;

receiving a second input from the pilot of the aircraft in the second mode of operation; and changing in the second mode of operation the preselect altitude value by the first amount from the current preselect altitude value toward a minimum altitude value in response to the second input received from the pilot, wherein the minimum altitude value is an altitude by which the pilot must abort a landing approach if a runway is not visible, and wherein the first amount that the preselect altitude value is changed by is dependent upon a proximity of the current preselect altitude value to the minimum altitude value.

2. The method of claim 1, wherein selecting the second mode of operation with the secondary input by the pilot further comprises selecting a BARO MIN mode.

3. The method of claim 2, wherein selecting the second mode of operation with a secondary input by the pilot further comprises selecting the BARO MIN mode using a select key and the minimum altitude value is a BARO MIN altitude.

4. The method of claim 1, wherein if a difference between the current preselect altitude value and the minimum altitude value is greater than a first interval, then the first amount that the preselect altitude value is changed by is equal to the first interval.

5. The method of claim 1, wherein if a difference between the current preselect altitude value and the minimum altitude value is less than a first interval, then the first amount that the preselect altitude value is changed is less than the first interval.

6. The method of claim 1, wherein if a difference between the current preselect altitude value and the minimum altitude value is less than a first interval, then the preselect altitude value is changed to the minimum altitude value.

7. The method of claim 1, wherein receiving the first input and the second input from the pilot further comprises receiving the first input and the second input from the pilot in the form of actuation of switches.

8. An avionics system for use in an aircraft, the avionics system comprising:
   display means for displaying a preselect altitude value for the avionics system, wherein the preselect altitude value is an altitude at which an autopilot system is adapted to level off the aircraft;
   pilot input means for receiving a first preselect altitude value change input from a pilot of the aircraft;
   control means for changing by a first amount the preselect altitude value displayed by the display means from a current preselect altitude value in a first mode of operation;
   secondary pilot input means for selecting a second mode of operation by the pilot;
   the pilot input means for receiving a second preselect altitude value change input from the pilot of the aircraft in the second mode of operation; and
   the control means for changing in the second mode of operation by the first amount the preselect altitude value displayed by the display means from the current preselect altitude value toward a minimum altitude value in response to the second input received from the pilot, wherein the minimum altitude value is an altitude by which the pilot must abort a landing approach if a runway is not visible, and wherein the first amount that the preselect altitude value is changed by is dependent upon a proximity of the current preselect altitude value to the minimum altitude value.

9. The avionics system of claim 8, wherein the secondary pilot input means for selecting the second mode of operation comprises selecting a BARO MIN mode.

10. The avionics system of claim 8, wherein the control means for changing the preselect altitude value displayed by the display means is adapted to change the preselect altitude value in a manner such that if a difference between the current preselect value and the minimum altitude value is greater than a first interval, then the first amount that the preselect altitude value is changed by is equal to the first interval.

11. The avionics system of claim 8, wherein the control means for changing the preselect altitude value displayed by the display means is further adapted to change the preselect altitude value in a manner such that if a difference between the current preselect value and the minimum altitude value is less than a first interval, then the first amount that the preselect altitude value is changed by is less than the first interval.

12. The avionics system of claim 8, wherein the control means for changing the preselect altitude value displayed by the display means is further adapted to change the preselect altitude value in a manner such that if a difference between the current preselect value and the minimum altitude value is less than a first interval, then the first amount that the preselect altitude value is changed to the minimum altitude value.

13. An avionics system for use in an aircraft, the avionics system comprising:
   a display adapted to display a preselect altitude value for the avionics system, wherein the preselect altitude value is an altitude at which an autopilot system is adapted to level off the aircraft;
   a pilot input device adapted to provide a first input from a pilot of the aircraft;
   a controller adapted to change by a first amount the preselect altitude value displayed by the display from a current preselect altitude value in a first mode of operation;
   a secondary pilot input device for selecting a second mode of operation by the pilot;
   the pilot input device for receiving a second preselect altitude value change input from the pilot of the aircraft in the second mode of operation; and
   the controller adapted to change in the second mode of operation by the first amount the preselect altitude value displayed by the display from the current preselect altitude value toward a minimum altitude value in response to the second input received from the pilot, wherein the minimum altitude value is an altitude by which the pilot must abort a landing approach if a runway is not visible, and wherein the first amount that the preselect altitude value is changed by is dependent upon a proximity of the current preselect altitude value to the minimum altitude value.

14. The avionics system of claim 13, wherein the secondary pilot input device selects a BARO MIN mode.

15. The avionics system of claim 13, wherein the controller is further adapted to change the preselect altitude value in a manner such that if a difference between the current preselect value and the minimum altitude value is greater than a first interval, then the first amount that the preselect altitude value is changed by is equal to the first interval.

16. The avionics system of claim 13, wherein the controller is further adapted to change the preselect altitude value in a manner such that if a difference between the current preselect value and the minimum altitude value is less than a first interval, then the first amount that the preselect altitude value is changed by is less than the first interval.

17. The avionics system of claim 13, wherein the controller is further adapted to change the preselect altitude value in a manner such that if a difference between the current preselect value and the minimum altitude value is less than a first interval, then the preselect altitude value is changed to the minimum altitude value.

\* \* \* \* \*